United States Patent [19]

Frankel

[11] 4,104,395

[45] Aug. 1, 1978

[54] METHOD FOR CONTROLLING DIAMETERS OF MICROCRYSTALLINE MINERAL FIBERS

[75] Inventor: Irwin Frankel, Springfield, Va.

[73] Assignee: Versar, Inc., Springfield, Va.

[21] Appl. No.: 809,255

[22] Filed: Jun. 23, 1977

[51] Int. Cl.$^2$ .............................................. D02G 3/00
[52] U.S. Cl. ...................................... 264/60; 264/62;
264/66; 264/DIG. 19
[58] Field of Search ....................... 264/60, 62, 63, 66, 264/0.5, DIG. 19

[56] References Cited

U.S. PATENT DOCUMENTS

| | | | |
|---|---|---|---|
| 3,311,689 | 3/1967 | Kelsey | 264/60 |
| 3,385,915 | 5/1968 | Hamling | 264/0.5 |
| 3,652,749 | 3/1972 | Sobel | 264/63 |
| 3,832,451 | 8/1974 | Abrams et al. | 423/489 |
| 3,899,555 | 8/1975 | Takao et al. | 264/63 |

*Primary Examiner*—Donald J. Arnold

*Attorney, Agent, or Firm*—Dowell & Dowell

[57] ABSTRACT

An improved method of making microcrystalline mineral fibers using a generally known technique of impregnating precursor organic fibers with salts of desired minerals dissolved in a solvent which is readily absorbed by the fibers, and subsequently heating and calcining the precursor fibers to leave mineral fibers comprising compounds of said impregnating salts which have diameters which in the prior art process are about half the diameter of the precursor fibers, the improvement involving controlling the diameters of the mineral fibers to reduce them greatly below the above-mentioned prior art diameters by impregnating the precursor fibers with a solution whose salt concentration is very small as compared with the high concentrations used in the prior art while taking steps to control the uniformity of the impregnation prior to calcining, the microcrystalline structures of some of the mineral fibers being improved by a final sintering step at higher temperatures than are used in the prior art.

3 Claims, 3 Drawing Figures

FIG. 1.

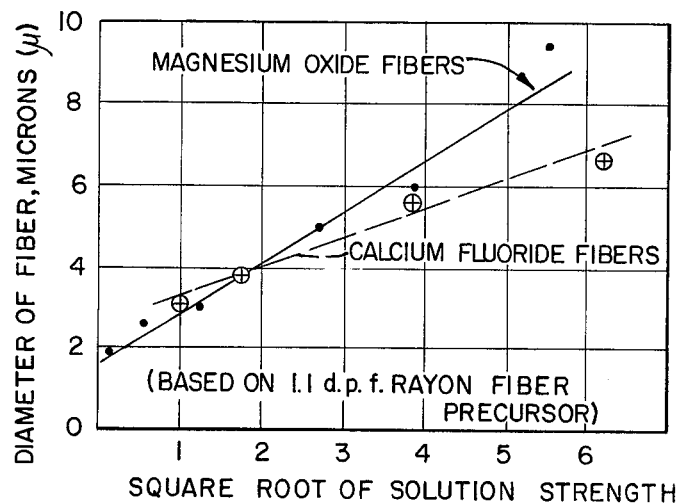

FIG. 2.

| EXAMPLE NO. | GRAMS HYDRATED MAG. ACETATE ADDED PER 100ml H₂O | MOLARITY | SOLUTION STRENGTH, (% BY WT.) | SQ. ROOT OF SOLN. STRENGTH | AVERAGE MgO FIBER DIAMETER MICRONS | MOLES OF MgO PER MOLE OF RAYON |
|---|---|---|---|---|---|---|
| 1 | 0.1 | 0.005 | 0.03 % | .17 | 1.9 | .0015 |
| 2 | 1 | 0.046 | 0.3 % | .55 | 2.5 | .032 |
| 3 | 5 | 0.23 | 1.5 % | 1.2 | 3 | .087 |
| 4 | 25 | 1.02 | 7.5% | 2.7 | 5.0 | .346 |
| 5 | 50 | 1.79 | 15% | 3.9 | 6.0 | — |
| 6 | 100 | 2.91 | 30% | 5.5 | 9.7 | — |

FIG. 3.

| EXAMPLE NO. | GRAMS HYDRATED CALCIUM NITRATE ADDED PER 100ml H₂O | MOLARITY | SOLUTION STRENGTH (% BY WT.) | SQ. ROOT OF SOLN. STRENGTH | AVERAGE CaF₂ FIBER DIAMETER MICRONS | MOLES OF CaF₂ PER MOLE OF RAYON |
|---|---|---|---|---|---|---|
| 7 | 2 | 0.09 | 1% | 1.0 | 3.0 | .037 |
| 8 | 5.5 | 0.23 | 3% | 1.73 | 3.8 | .073 |
| 9 | 27 | 1.04 | 15% | 3.87 | 5.5 | .355 |
| 10 | 97 | 2.80 | 39.5% | 6.28 | 6.8 | .708 |

METHOD FOR CONTROLLING DIAMETERS OF MICROCRYSTALLINE MINERAL FIBERS

GOVERNMENT CONTRACT

The invention described herein was made under Contract with the United States Air Force.

BACKGROUND AND PRIOR ART

Modern aircraft presently use elastomeric and other polymeric matrix materials in a wide variety of applications including seals, hoses, tires, O-rings, etc., and many of these parts must operate over a very wide temperature range and at high pressures, some parts encountering pressures up to 5000 psi and temperatures in a range from −65° to 800° F. These elastomeric parts are reinforced by inorganic fibers which must be compatible with the matrix material, and must have maximum strength to extend the life of the parts in the pressure and temperature ranges in which they operate. Inadequate strength at elevated temperatures has been a limiting physical characteristic for elastomeric materials. These materials for many aircraft applications must not only be stable in a variety of environments at elevated temperatures but also must maintain adequate strength.

For example, hydrofluorocarbon elastomers have exhibited superior aging qualities in the temperature range of 400° to 600° F, but the use of these elastomers has been severely hampered because of their low strength at the elevated temperatures. It has been demonstrated that the addition of compatible inorganic fibrous reinforcing materials to fluoroelastomers can markedly increase tensile strength at 400° F and improve their resistance to strength degradation after prolonged periods at 600° to 800° F. It has also been shown that purity of the reinforcing media, which is required to preserve compatibility, is necessary to achieve maximum resistance to high temperature degradation. Fluoride fibers have been used with hydrofluorocarbon elastomers, and metal oxide fibers have been used to reinforce other elastomers and polymers as well as hydrofluorocarbon elastomers.

It is generally recognized that as the diameter of a fiber is reduced, assuming substantially circular cross-section, the tensile strength of the fiber is increased, the tensile strength varying as the ratio of the circumference to the mass. In order to achieve higher strength products, it is therefore desirable to be able to make smaller diameter reinforcing fibers while still preserving their purity and their microcrystalline structure.

The prior art U.S. Pat. Nos. 3,385,915 to Hamling, and 3,832,451 to Abrams and Shaver teach processes for producing various inorganic fibers by impregnating organic precursor fibers with solutions of salts and then calcining the impregnated precursors to drive off the organic matter and leave inorganic fibers of microcrystalline structure. In general, the impregnating solutions used in the prior art were rather concentrated so as to leave in the precursor fibers a dense deposit of salts, whereby the diameter of the resulting mineral fiber was closely related to the diameter of the precursor fiber, the shrinkage usually not exceeding about 40% to 60% as compared with the diameter of the original precursor fiber. The degree of loading of the salts into the precursor fiber according to the teachings of the prior art was deliberately increased by pre-swelling of the precursor by soaking it in water. U.S. Pat. No. 3,385,915 (supra) includes the statement that the degree of shrinkage is inversely proportional to the degree of loading of metal compound into the precursor, see column 7, lines 68–70; and further includes lines 44 to 59, which indicates that there is a minimum impregnation loading below which inadequate strength of the resulting mineral fiber will result.

The accepted way of controlling the diameter of the finished mineral fiber has been to select a suitable diameter for the precursor fiber, such that after calcining of the loaded precursor and sintering of the resulting mineral fiber, the latter will have the desired diameter. In practice, however, this approach fails to provide small enough mineral fibers, because very small precursor organic fibers are not available as a manufactured fiber, and natural organic fibers have larger diameters. The smallest diameter rayon precursor fiber tested was 0.75 denier per filament (d.p.f.), which was used to produce a MgO fiber averaging 8 microns in diameter, but even this 0.75 d.p.f. fiber has now become commercially unavailable. Moreover, it was not a very uniform diameter fiber as to diameter. Currently, rayon fibers of 1.1, 1.5 and 3.0 d.p.f. are the smallest available diameters. The 1.1 d.p.f. fibers average about 11 microns in diameter, although they vary between 8 and 14 microns in commercially available products. This variation is excessive.

In order to produce mineral fibers of smaller diameters at acceptable costs, one must use commercially available precursor organic fibers, and therefore work was done to provide an improved mineral-fiber-making process which could impregnate lower salt concentrations into available organic precursor fibers of the order of 1 d.p.f. without the degradation in crystal structure or in strength of the resulting mineral fiber, this effort being contrary to the degradation forecast in U.S. Pat. No. 3,385,915 as a result of lowering still further the concentration of the impregnating salt solutions.

THE INVENTION

The process of the present invention is basically similar to the prior art mineral fiber making processes in that it performs the basic steps of impregnating organic precursor fibers with a mineral salt solution, dries the fibers, calcines the fibers to eliminate the organic materials, and heat treats the remaining mineral fibers to improve their structure and make it microcrystalline. However, the present process seeks to make a mineral fiber of much smaller diameter as compared with the diameter of the precursor organic fiber without sacrifice of its tensile strength, greater tensile strength being the reason for making fibers of smaller diameters.

To make a fiber having improved tensile strength it is necessary to achieve uniformity in the loading of the precursor fibers with the impregnating salts, despite the relatively low salt concentration of the solution. Pre-soaking of the precursor fibers to cause them to swell and thereby hold a greater quantity of salts was considered desirable in the prior art processes but it is non-useful, and in fact counter-productive, in the present process. When the precursor fibers are merely impregnated with a salt solution without preconditioning even in the absence of pre-soaking, the quantity of salts left in the fibers varies excessively because the fibers contain an unknown amount of moisture already, which amount varies with ambient temperature and humidity conditions. In the case of rayon, for example, at 70° F the moisture content tends toward about 11% by weight.

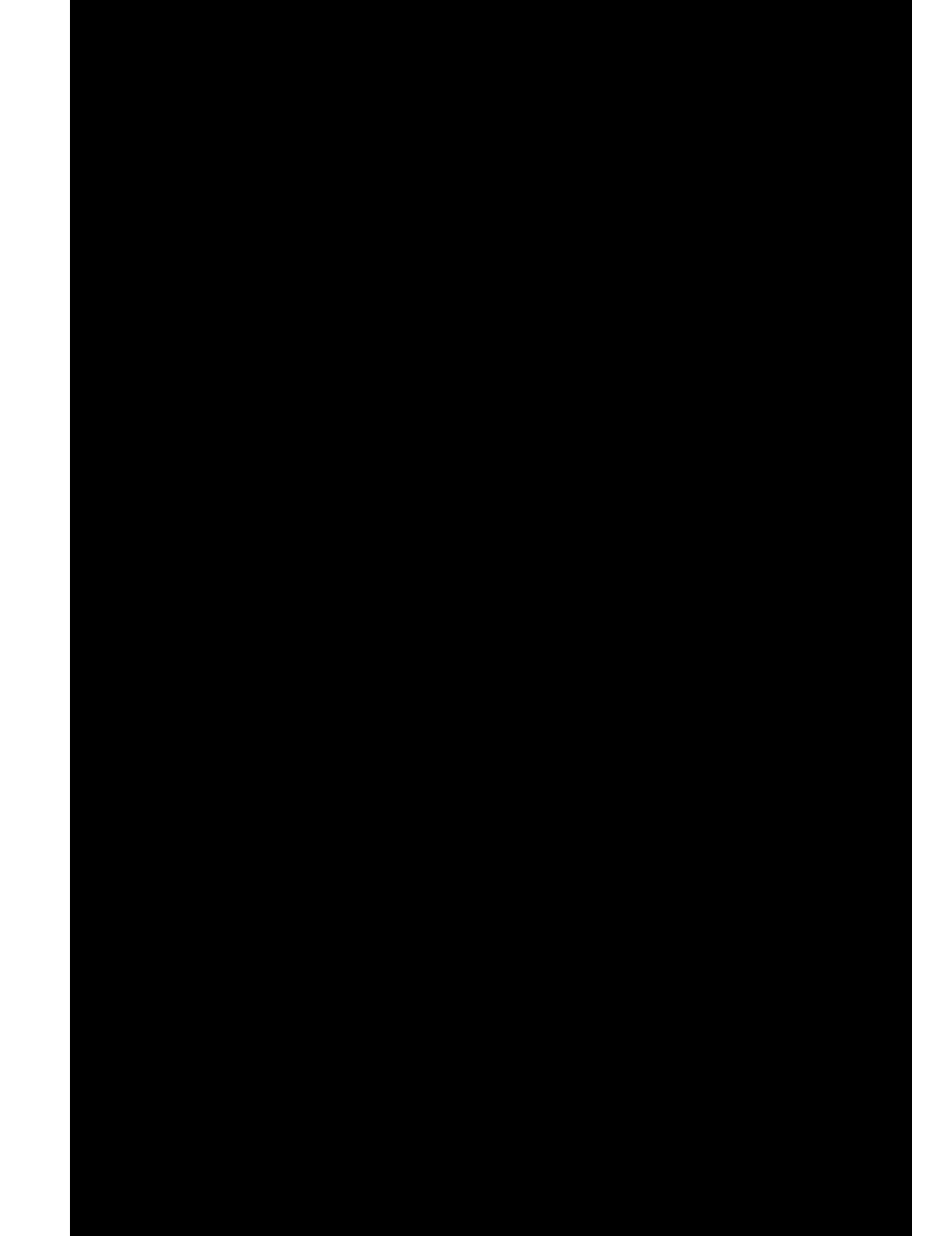

step leaves them. The sintering improves this structure so that it becomes microcrystalline, whereby the tensile strength of the fibers rises to a level suitable for reinforcement purposes.

The above steps have been performed also with woven cotton fabrics, and the results are similar. The fabric retains its woven character after the sintering step is completed.

FLUORIDE FIBER PROCESS

EXAMPLES 7, 8, 9, and 10 are tabulated in FIG. 3, and relate to the making of calcium fluoride fibers of reduced diameter. The process varies somewhat from the oxide fiber technique because the precursor fibers must be impregnated in two steps. As in the previously described Examples, the precursor fibers were washed and pre-dried. Then they were immersed in a solution of calcium nitrate, the strength of which was controlled as shown in FIG. 3 to control the ultimate diameter of the resulting mineral fiber. When the calcium nitrate solution had been fully absorbed into the precursor fibers, the fibers were then immersed in an excess solution of ammonium fluoride whose concentration need not be varied in this process because any excess simply washes away in the next step. Within the precursor fibers, insoluble calcium fluoride was precipitated and deposited in a quantity determined by the concentration of the calcium nitrate solution originally soaked into the fibers. The precursor fibers were then washed to remove the resulting soluble ammonium nitrate and the excess uncombined ammonium fluoride, leaving the deposited calcium fluoride.

The precursor fibers containing the precipitated calcium fluoride salt were then dried, and subsequently subjected to two of the three heating steps set forth above, stopping after 800° C because the calcium fluoride can not be subjected to 1400° C without melting. The 800° C temperature is sufficient to achieve sintering of the calcium fluoride fibers to provide microcrystalline structure. The four horizontal rows in the table of FIG. 3 show concentrations of the calcium nitrate solution versus the resulting calcium fluoride fiber diameters. Note that the curve for the calcium fibers, FIG. 1, is still linear although its slope is different from the curve plotted for the magnesium oxide fibers, the linear relationship between fiber diameters and square roots of the concentrations holding for both types of fibers.

This invention teaches how to make fibers which are much smaller in diameter than the precursor fibers by reducing the concentration of the impregnating solution. However, the precursor fibers contain inorganic impurities. Therefore, as the diameter of the precursor fiber is increased, the quantity of impurities goes up proportionately with its volume. These impurities are for the most part left in the mineral fiber and tend to reduce its strength as well as its purity, which may also affect its compatibility with the matrix material which it is employed to reinforce. Hence, it is desirable to use the smallest available precursor fiber in a given process.

Although the prior art indicates that in order to obtain adequate strength in the final mineral fibers, it is considered necessary that the precursor fibers be imbibed with the impregnating metal compounds to the extent of at least one quarter mole of the metal compound in each base mole of precursor, i.e. a mole ratio of at least 0.25, the present invention achieves very much smaller ratios down to 0.0015, and perhaps beyond, by drying the precursor fiber prior to impregnation so that the impregnation, though of very low strength, will be uniform throughout the precursor prior to calcining and sintering at a temperature below the melting point of the mineral fiber but still effective to achieve microcrystalline structure in the particular mineral fiber. Fibers made in this manner have excellent strength characteristics, and it is possible to control and vary their diameters so that the final mineral fiber is very much smaller than the diameter of the precursor mineral fiber.

This invention is not to be limited to the specific Examples given, for obviously other mineral fibers can be made using other impregnating solutions as suggested in the prior art.

I claim:

1. The method of making high tensile strength microcrystalline mineral fibers, by impregnating organic rayon precursor fibers with a desired mineral compound selected from the group magnesium oxide and calcium fluoride which is deposited in the fibers in solution form, and then calcining the impregnated precursor, where the diameters of the resulting mineral fibers for a particular diameter of precursor fiber are controlled and varied linearly as the square root of the strength of the impregnating mineral compound solution, the process including the steps of:
   (a) washing and drying rayon precursor fibers to drive moisture therefrom until their weight becomes substantially constant;
   (b) immersing the dried fibers in an impregnating solution and depositing the desired mineral compound in the precursor fibers with such concentration that the mole ratio of mineral compound deposited to rayon precursor lies in the range from 0.0015 to just below 0.25;
   (c) drying the fibers to drive the moisture therefrom;
   (d) heating the fibers in a furnace gradually to a temperature of about 400° C and maintaining that temperature for about 4 hours to drive off the organic precursor fibers and leave mineral fibers, and
   (e) further heating the mineral fibers to a higher temperature approaching but below their melting temperature to calcine and sinter the mineral fibers.

2. The method as set forth in claim 1, wherein said mineral compound is magnesium oxide and said solution is magnesium acetate, and wherein said further heating step includes gradually heating the mineral fibers to about 800° C and holding this temperature for about 4 hours to calcine the fibers, and then gradually heating the fibers to about 1400° C and holding this temperature for about 4 hours to sinter the mineral fibers.

3. The method as set forth in claim 1, wherein the resulting mineral fibers are calcium fluoride, said impregnating solution is calcium nitrate, and said immersion step further includes the step of immersing the precursor fibers impregnated with said solution into an excess solution of ammonium fluoride to thereby precipitate within the precursor fibers calcium fluoride; washing the precursor fibers to remove therefrom ammonium nitrate and uncombined ammonium fluoride prior to drying said fibers to drive the moisture therefrom, and wherein said further heating step gradually raises the temperature to about 800° C and maintains this temperature for about 4 hours.

* * * * *